US012399650B2

(12) United States Patent
Muthiah et al.

(10) Patent No.: US 12,399,650 B2
(45) Date of Patent: Aug. 26, 2025

(54) DATA STORAGE DEVICE AND METHOD FOR HOST-ASSISTED DEFERRED DEFRAGMENTATION AND SYSTEM HANDLING

(71) Applicant: Sandisk Technologies, Inc., Milpitas, CA (US)

(72) Inventors: Ramanathan Muthiah, Bangalore (IN); Ramkumar Ramamurthy, Bangalore (IN); Bhavya Krishna, Ernakulam (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/223,691

(22) Filed: Jul. 19, 2023

(65) Prior Publication Data
US 2024/0256180 A1    Aug. 1, 2024

Related U.S. Application Data

(60) Provisional application No. 63/442,564, filed on Feb. 1, 2023.

(51) Int. Cl.
G06F 3/06    (2006.01)
(52) U.S. Cl.
CPC ............ G06F 3/0659 (2013.01); G06F 3/064 (2013.01); *G06F 3/0607* (2013.01); *G06F 3/0679* (2013.01)

(58) Field of Classification Search
CPC ........ G06F 3/0607; G06F 3/061; G06F 3/064; G06F 3/0643; G06F 3/0659; G06F 3/0679
See application file for complete search history.

(56) References Cited

U.S. PATENT DOCUMENTS

| 8,626,987 B2 | 1/2014 | Jung et al. |
| 9,645,741 B2 | 5/2017 | Duzly et al. |
| 2007/0027940 A1* | 2/2007 | Lutz ............... G06F 3/0677 |
| 2009/0287884 A1* | 11/2009 | Toyoshima ....... G06F 12/0862 |
| | | 711/E12.017 |

(Continued)

FOREIGN PATENT DOCUMENTS

KR    20190012622 A    2/2019

OTHER PUBLICATIONS

NVM Express® Base Specification, Revision 2.0c; NVM Express; Oct. 4, 2022; 458 pages.

*Primary Examiner* — Aracelis Ruiz
(74) *Attorney, Agent, or Firm* — Crowell & Moring LLP (57) ABSTRACT

A data storage device and method for host-assisted deferred defragmentation and system handling are provided. In one embodiment, the data storage device comprises a memory and a controller. The controller is configured to receive, from a host, a plurality of write commands and a grouping identifier associated with the plurality of write commands, wherein the plurality of write commands comprise a plurality of non-sequential logical block addresses and a plurality of sequential segments of a file; and in response to the grouping identifier being associated with the plurality of write commands, execute the plurality of write commands by storing the plurality of sequential segments of the file sequentially in the memory even though the logical block addresses associated with the segments of the file are non-sequential. Other embodiments are possible, and each of the embodiments can be used alone or together in combination.

20 Claims, 9 Drawing Sheets

(56) References Cited

U.S. PATENT DOCUMENTS

| | | | |
|---|---|---|---|
| 2010/0172179 A1* | 7/2010 | Gorobets | G06F 12/0246 |
| | | | 365/185.11 |
| 2010/0312983 A1 | 12/2010 | Moon et al. | |
| 2011/0099326 A1 | 4/2011 | Jung et al. | |
| 2013/0166818 A1 | 6/2013 | Sela | |
| 2013/0282955 A1 | 10/2013 | Parker et al. | |
| 2014/0223083 A1 | 8/2014 | Park et al. | |
| 2018/0173420 A1 | 6/2018 | Li et al. | |
| 2022/0113899 A1* | 4/2022 | Jung | G06F 3/0688 |
| 2023/0409217 A1* | 12/2023 | Ghaly | G06F 3/0679 |

\* cited by examiner

DATA STORAGE DEVICE AND METHOD FOR HOST-ASSISTED DEFERRED DEFRAGMENTATION AND SYSTEM HANDLING

CROSS-REFERENCE TO RELATED APPLICATION

This application claims priority to U.S. provisional patent application No. 63/442,564, filed Feb. 1, 2023, which is hereby incorporated by reference.

BACKGROUND

If the memory of a data storage device is heavily fragmented, a host file system can opt for defragmentation of the memory to ensure that a large file can be written in contiguous logical block addresses (LBAs), which will eventually result in good sequential read performance. However, defragmentation can lead to a lot of data movement inside the memory, which can reduce performance at the time of defragmentation.

DETAILED DESCRIPTION

Overview

By way of introduction, the below embodiments relate to a data storage device and method for host-assisted deferred defragmentation and system handling. In one embodiment, a data storage device is provided comprising a memory and a controller. The controller is configured to communicate with the memory and further configured to: receive, from a host, a plurality of write commands and a grouping identifier associated with the plurality of write commands, wherein the plurality of write commands comprise a plurality of non-sequential logical block addresses and a plurality of sequential segments of a file; and in response to the grouping identifier being associated with the plurality of write commands, execute the plurality of write commands by storing the plurality of sequential segments of the file sequentially in the memory even though the logical block addresses associated with the segments of the file are non-sequential.

In some embodiments, the controller is further configured to: group together logical-to-physical address translation entries for the plurality of non-sequential logical block addresses.

In some embodiments, the controller is further configured to: receive an additional write command from the host; and determine whether a logical block address in the additional write command is associated with a previously-received grouping identifier.

In some embodiments, the controller is further configured to: in response to determining that the logical block address in the additional write command is associated with the previously-received grouping identifier, determine whether there is an open sequential stream for the previously-received grouping identifier.

In some embodiments, the controller is further configured to: in response to determining that there is an open sequential stream for the previously-received grouping identifier, route data in the additional write command to the open sequential stream.

In some embodiments, the controller is further configured to: in response to determining that there is not an open sequential stream for the previously-received grouping identifier, open a new stream and route data in the additional write command to the opened new stream.

In some embodiments, the controller is further configured to: receive a read command from the host; and determine whether a logical block address in the read command is associated with the grouping identifier.

In some embodiments, the controller is further configured to: in response to determining that the logical block address in the read command is associated with the grouping identifier, retrieve a grouped logical-to-physical address translation entry corresponding to the grouping identifier.

In some embodiments, the controller is further configured to: in response to determining that the logical block address in the read command is associated with the grouping identifier, perform sequential read operations to read data in locations in the memory that are associated with the logical block address in the read command and with logical block addresses associated with the grouping identifier.

In some embodiments, the controller is further configured to: in response to determining that the logical block address in the read command is associated with the grouping identifier, perform a read look-ahead (RLA) operation.

In some embodiments, the controller is further configured to: generate a virtual logical block address range from the plurality of non-sequential logical block addresses.

In some embodiments, the grouping identifier comprises a defragmentation identifier.

In some embodiments, the memory comprises a three-dimensional memory.

In another embodiment, a method is provided that is performed in a host in communication with a data storage device comprising a memory. The method comprises: determining a need to defragment a logical block address space; associating a defragmentation identifier with a plurality of random write commands in the logical block address space; and sending the defragmentation identifier and the plurality of random write commands to the data storage device, wherein the association of the defragmentation identifier with the plurality of random write commands is configured to cause data in the plurality of random write commands to be stored sequentially in the memory.

In some embodiments, the method further comprises associating a plurality of defragmentation identifiers with multiple ranges of logical block addresses.

In some embodiments, the method further comprises determining whether a number of defragmentation identifiers created by the host exceeds a threshold.

In some embodiments, the defragmentation identifier is associated with the plurality of random write commands in response to determining that the number of defragmentation identifiers created by the host does not exceed the threshold.

In some embodiments, the method further comprises sending a defragmentation command to the data storage device in response to determining that the number of defragmentation identifiers created by the host exceeds the threshold.

In some embodiments, the method further comprises deleting previously-created defragmentation identifiers in response to receiving a notification from the data storage device indicating that the defragmentation command was executed.

In another embodiment, a data storage device is provided comprising: a memory; means for receiving, from a host, a plurality of write commands and a defragmentation identifier associated with the plurality of write commands, wherein the plurality of write commands comprise a plurality of non-sequential logical block addresses and a plurality of sequential segments of a file; and means for executing the plurality of write commands by storing the plurality of sequential segments of the file sequentially in the memory even though the logical block addresses associated with the segments of the file are non-sequential.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figures 1A, 1B:
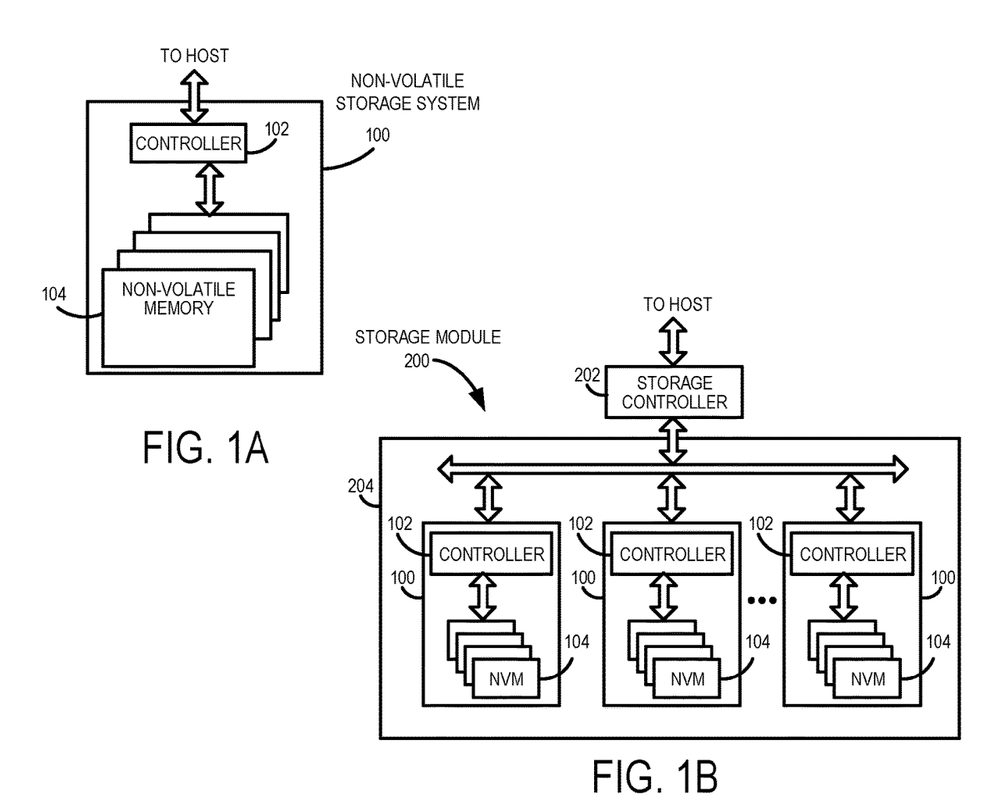
FIG. 1A is a block diagram of a data storage device of an embodiment.
FIG. 1B is a block diagram illustrating a storage module of an embodiment.
Figure 1C:
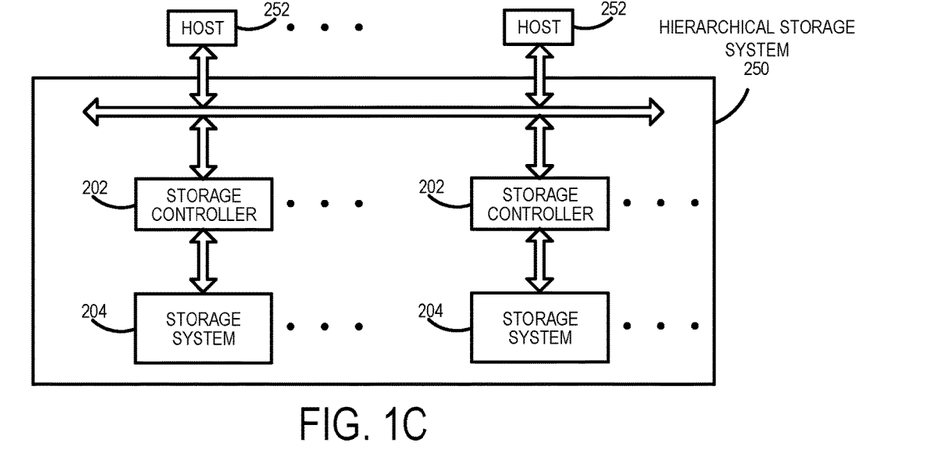
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
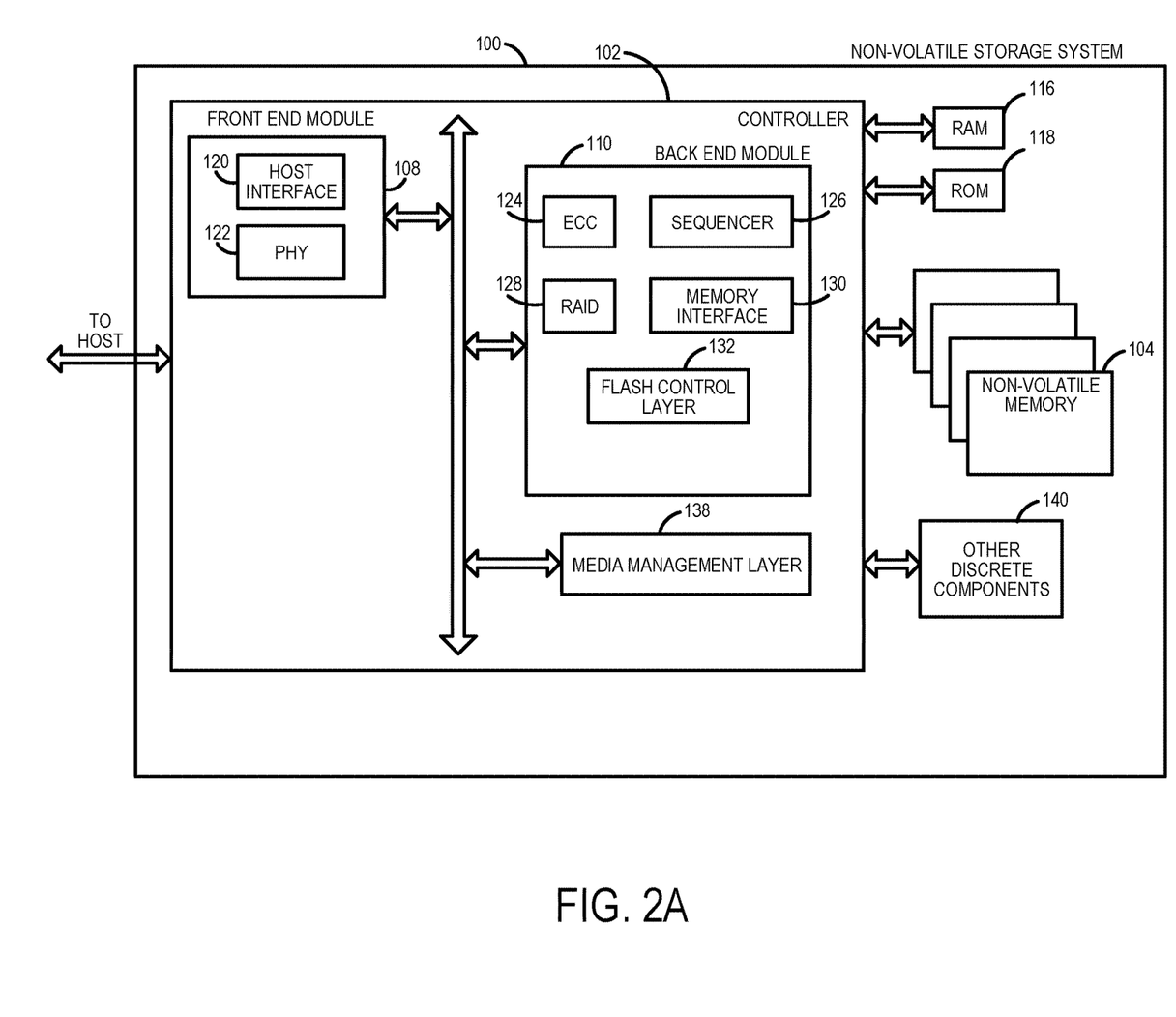
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
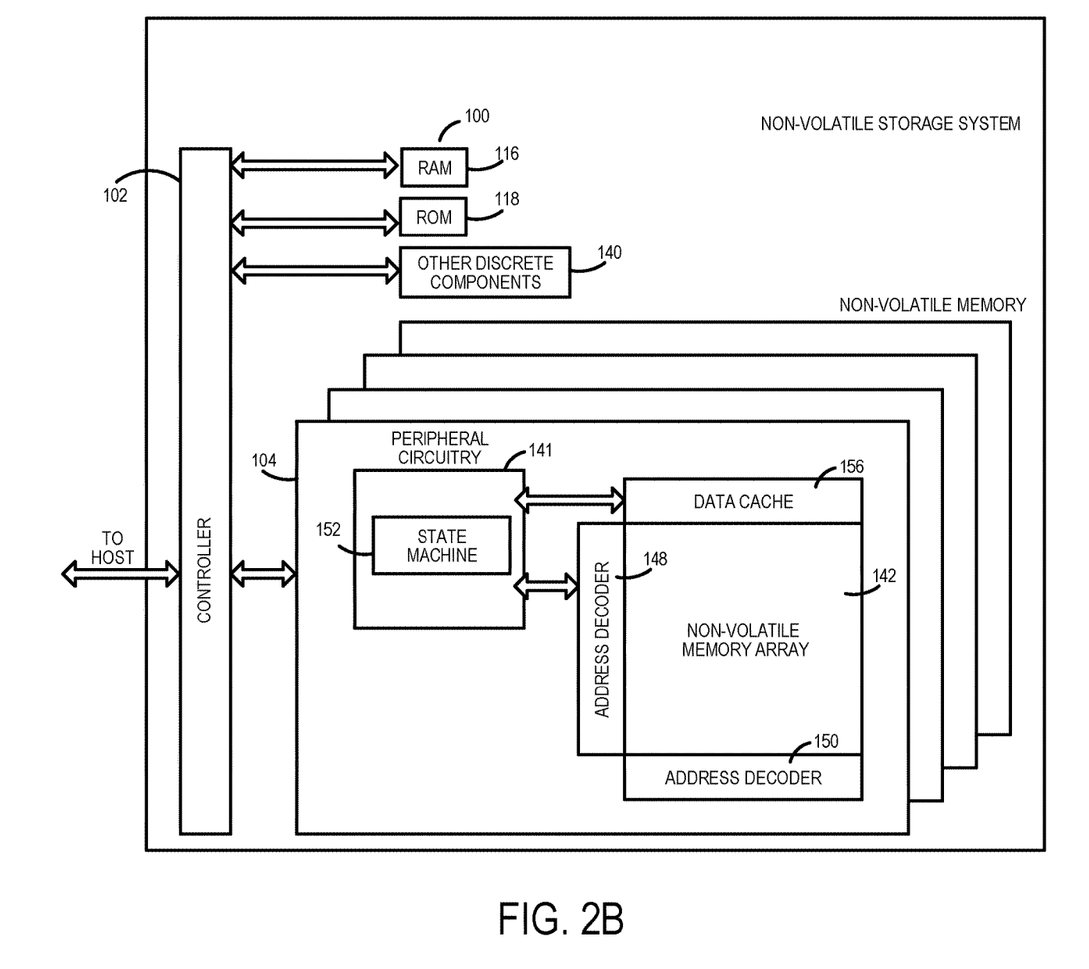
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
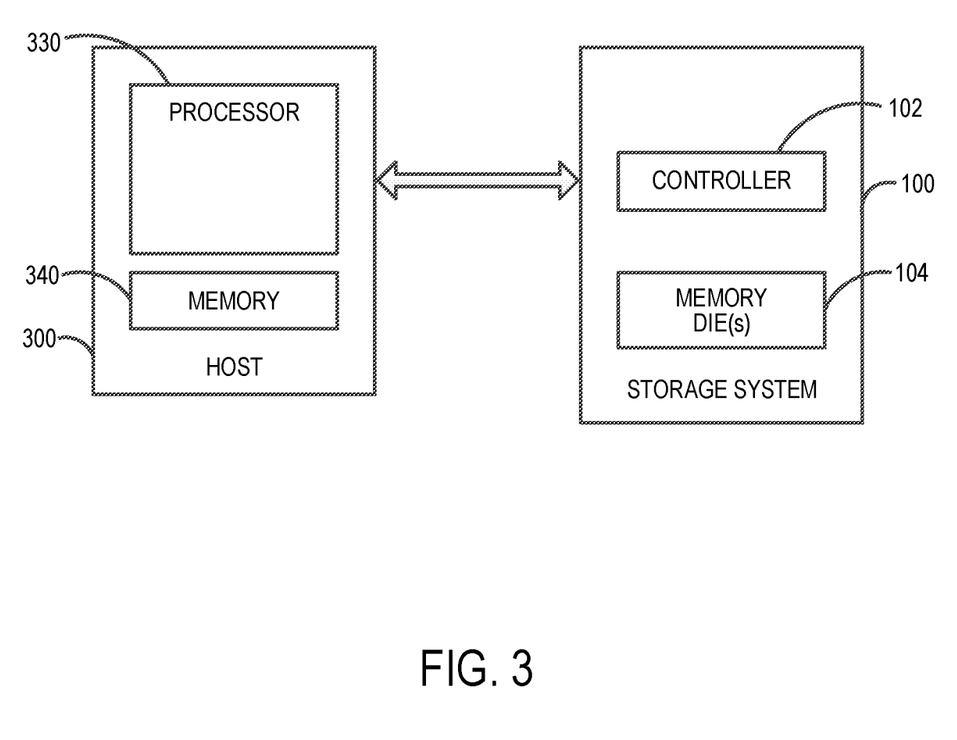
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc.

The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, during a write of a large file (e.g., large chunks of sequential data representing different segments/portions of the file), if the memory 104 is heavily fragmented, the host file system can opt for defragmentation to ensure that the large file is stored in contiguous logical block addresses (LBAs), which will eventually result in good sequential read performance. On the other hand, defragmentation can lead to a lot of data movement inside the memory 104, which can come with a cost of a performance dip at the time of defragmentation.

There are many scenarios that can lead to defragmentation. One common scenario is when multiple files of multiple sizes are written and rewritten in the memory 104. The host file system (FS) can opt for defragmentation in logical space in response to this. Another scenario leading to defragmentation is when a first copy of a large sequential file is written when the memory 104 is not fragmented (leading to storage in continuous LBA ranges), but subsequent host overwrites to small sections of the file (e.g., patches/updates to the file) are stored in non-continuous LBAs due to spillover, where the data storage device 100 treats these small chunks as random pieces of data. Here again the host file system can opt for defragmentation resulting in internal data movement overhead.

One way to avoid the overhead of defragmentation is to simply not use defragmentation. However, if defragmentation is not used, the sequential read performance can drastically drop as each chunk of LBA ranges will be treated by the data storage device 100 as random data, and each random read will be accompanied by control reads to the flash translation layer (FTL) table (or other data structure) for translating logical addresses to physical addresses, thus not meeting sequential read performance rates. Additionally, instead of using a host-side implementation of defragmentation, a device-side implementation can be used with look-aside tables (or other data structures) to optimize data movement. In any event, defragmentation may be considered as a last option since defragmentation is bandwidth- and write-amplification-intensive. On the other hand, not performing defragmentation can lead to a drop in sequential read performance.

The following embodiments provide a middle ground to achieve a read performance that matches sequential read rates in a heavily-fragmented device without the overhead of defragmentation.

Starting first with host-side logic, in one embodiment, the processor 330 in the host 300 (e.g., executing computer-readable program code stored in a memory of the host 300) can perform LBA grouping of the sequential data and provide a grouping hint to the data storage device 100 alongside the storage command when the host 300 determines that file system defragmentation is due. The host 300 can associate a "defrag identifier" to multiple commands (e.g., random commands in the logical address space) to associate them with a sequential request for an actual sequential candidate. Further, the host 300 can create multiple defrag identifiers for multiple ranges of grouping. For example, if a movie with sequential data is written in a fragmented LBA space, the host 300 can provide the LBA grouping hint and defrag identifier alongside issued commands, which are not sequential.

Figure 4:
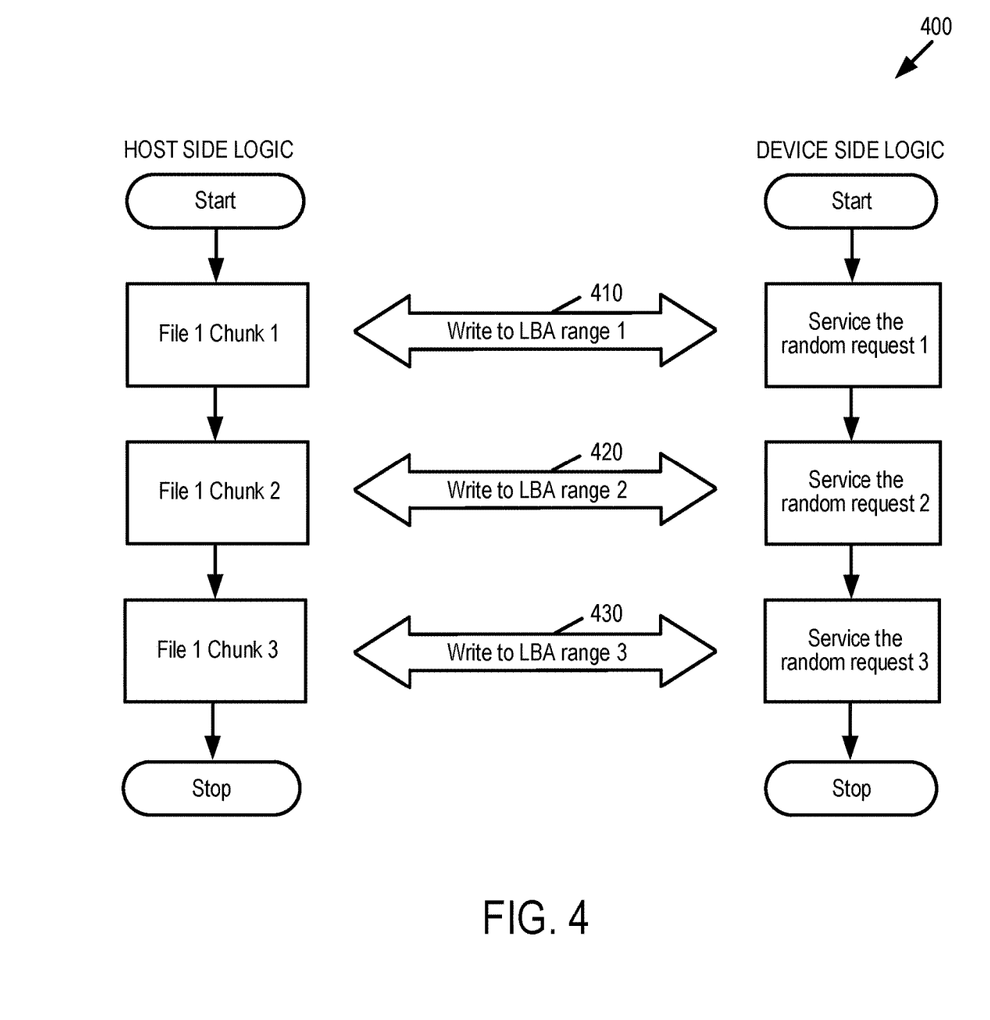
FIG. 4 is a flow chart illustrating a system flow of an embodiment.
Figure 5:
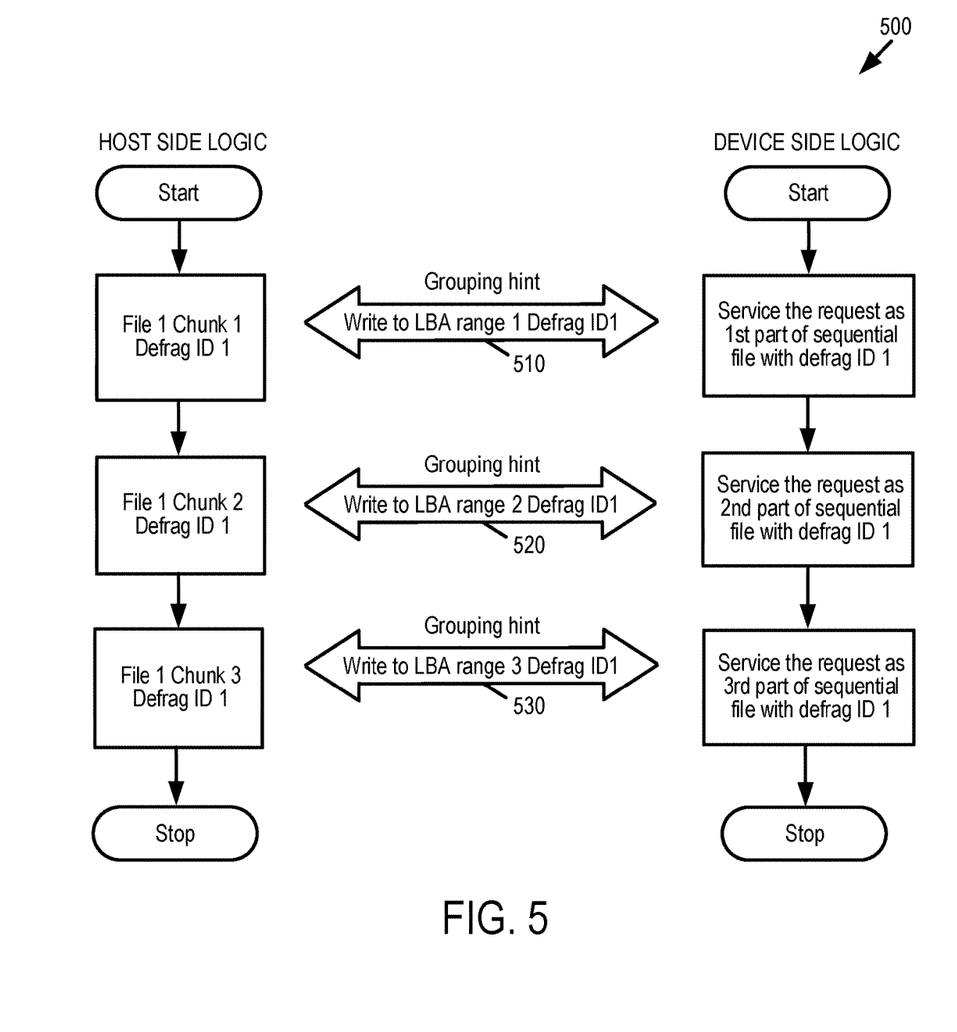
FIG. 5 is a flow chart illustrating a system flow of an embodiment that uses defragmentation identifiers.

FIGS. 4 and 5 are flow charts 400, 500 that illustrate system flows without and with the use of defrag identifiers. As shown in the flow chart 400 in FIG. 4, to write chucks of a file in non-continuous LBA ranges 1, 2, and 3 without the use of defrag identifiers, the host 300 sends individual write commands to the various LBA ranges to the data storage device 100 (acts 410, 420, 430). In response to these commands, the controller 102 of the data storage device 100 services the random write commands, resulting in the file being stored in an LBA-fragmented manner, which may require traditional host file system defragmentation in the future. In contrast, as shown in FIG. 5, when defrag identifiers are used, the host 300 places a common defrag identifier ("Defrag ID 1" in this example) as a "grouping hint" in each of the write commands sent to the data storage device 100 (acts 510, 520, 530). The controller 102 of the data storage device 100 services these commands and can later use the grouping hint to more efficiently perform defragmentation, as described below.

In one embodiment, the host 300/host processor 330 is configured to implement a host-side defrag manager that tracks the number of defrag identifiers created in the system and follows a system threshold based on which it determines when an actual defragmentation of the memory 104 in the data storage device 100 is imminent. At that point, the host 300 can send a notification to delete all defrag identifiers and the grouping information prior to issuing a defrag request. In short, in this embodiment, the host 300 can generate the LBA grouping hint of sequential data to work around the file system defragmentation issue (i.e., to extend or delay the defragmentation timelines until an imminent defragmentation). This can enable better quality of service (QoS) during the transition phase.

Figure 6:
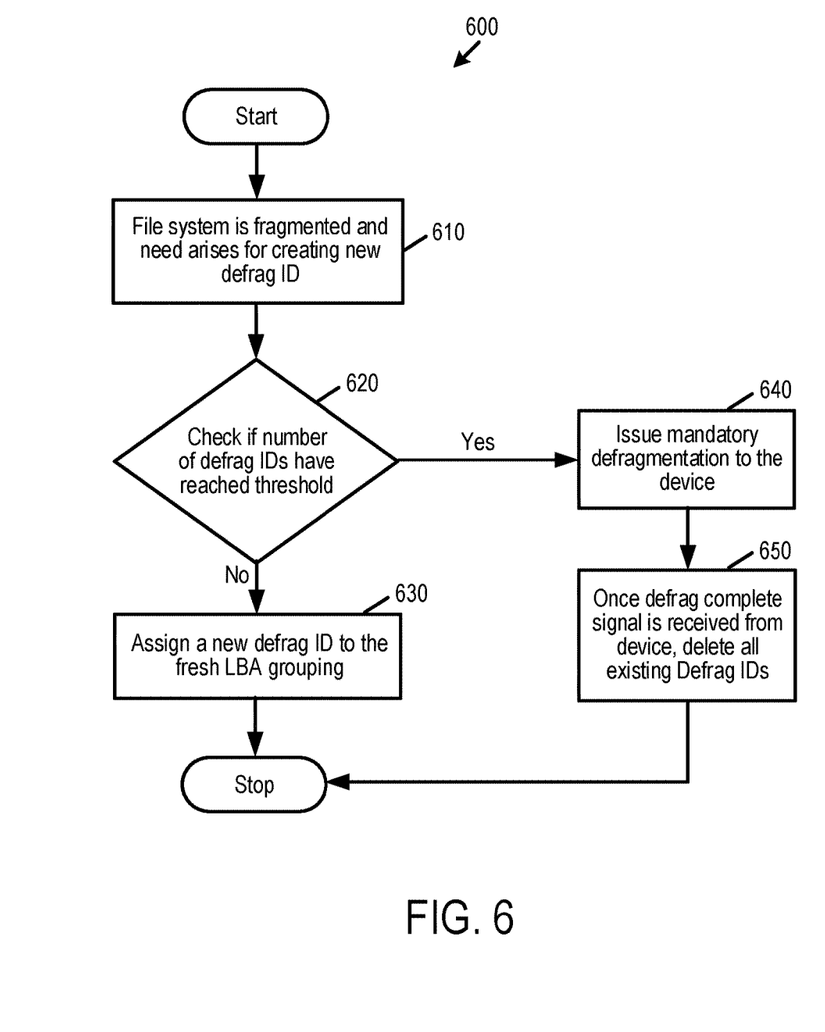
FIG. 6 is a flow chart of a method of an embodiment that uses a defragmentation manager.

FIG. 6 is a flow chart 600 of a method that illustrates the use of a defrag manager. As shown in FIG. 6, a determination is made that the file system is fragmented and that there is a need to create a new defrag identifier (ID) (act 610). The processor 330 in the host 300 then checks if the number of created defrag IDs has reached a threshold (act 620). If the number of created defrag IDs has not reached a threshold, the processor 330 in the host 300 assigns a new defrag ID to a fresh LBA grouping (act 630). However, if the number of created defrag IDs has reached a threshold, the processor 330 in the host 300 issues a "mandatory" defragmentation command to the data storage device 100 (act 640). Once a "defragmentation complete" signal is received from the data storage device 100, the processor 330 in the host 300 deletes all existing defrag IDs (act 650).

Turning now to the device-side logic, using the proposed grouping hint and the defrag identifier, the controller 102 in the data storage device 100 can treat the data as sequential data even though the LBA addresses are not sequential/continuous. Hence, the controller 102 can use the LBA grouping information as metadata to perform read look-ahead (RLA) operations. Further, during writes, the virtual random data (actually sequential data, but random because of the lack of continuous LBA space) can be written in the same sequential block on par with sequential data to aid optimal NAND fetch and better performance. The controller 102 can further group the logical-to-physical (L2P) control entries for a defrag identifier to keep the control overheads minimal, leveraging the fact that the sequential data is read together. Grouping the L2P control entries for a defrag identifier can help minimize device control overhead since the consolidated metadata is stored by the controller 102 in one place. L2P metadata consolidation avoids loading L2P pages for random data separately, which otherwise is triggered in a fragmented device.

In one embodiment, non-defragment requests stay as is. That is, if the requests are such that the host 300 can fit the file in the available LBA space, there is no need for a defrag identifier. Since the defrag requests are bandwidth expensive, the host 300 may not immediately trigger one just because the file system needs defragmentation. Instead, the host 300 may take a middle ground to extend defragment timelines, as well as maintain the QoS on par with a defragmented region until the actual defragmentation occurs. The proposed delayed defragmentation enables maximum value since the fragmentation caused in the transit phase is also accommodated for during defragmentation. This can also vastly reduce write amplification for the same QoS.

The following paragraphs describe one example implementation of a host-assisted deferred defragmentation technique. It should be understood that this is merely an example and that other implementations can be used.

In one example implementation, a delayed defragmentation technique that meets QoS requirements is achieved with the introduction of a command grouping hint table (or other data structure) and a defrag identifier for sequential access. When the host file system in a fragmented device abstains from issuing defragmentation, it will be aware of the mapping between the file and the LBA ranges associated with it. The host 300 can pass this mapping information as hinting commands to the data storage device 100 before issuing the writes to the data storage device 100, and the data storage device 100 can maintain these hints in a command grouping hint table for a given identifier. Each identifier can be unique for a grouping of commands in a region.

In one embodiment, during host writes, the controller 102 of the data storage device 100 consults this table, and if the LBA falls in any of the ranges in the LBA group table for the transaction associated to an identifier, the controller 102 will route it to the same sequential host stream where the rest of the LBA ranges that are part of this entry are written to ensure that it is written to the same block. This will ensure that the LBA chunks will share the same reverse FTL page or adjacent ones and will reduce control reads during internal data movement operations that happen in the background and will improve write performance. Thus, although the LBA ranges are not sequential, the device handling is on par with sequential data, thereby helping ensure a sequential type of QoS for non-sequential data. The FTL entries for the LBA ranges under the defrag ID can also be optimized.

Figure 7:
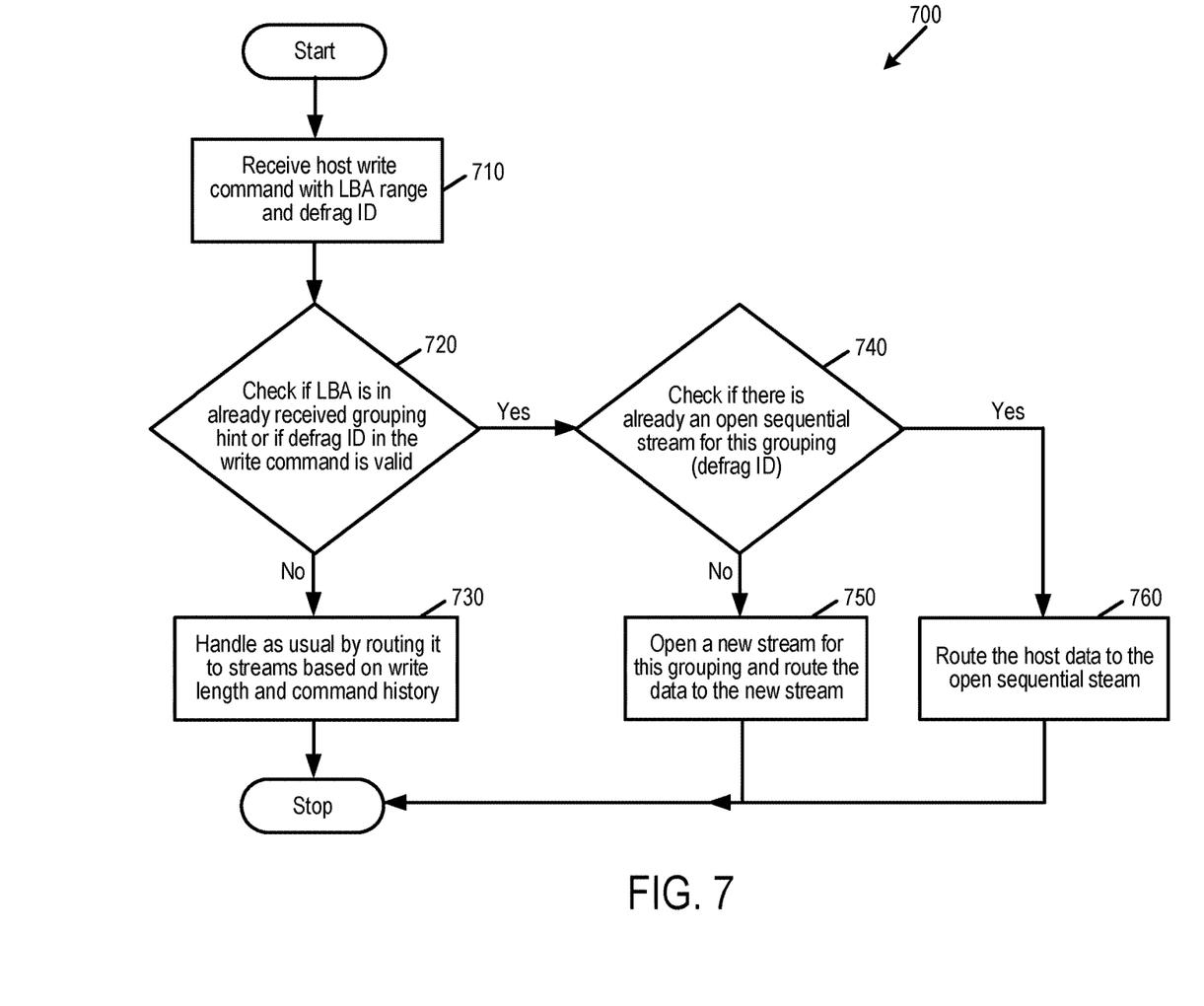
FIG. 7 is a flow chart of a write flow of an embodiment.

Turning again to the drawings, FIG. 7 is a flow chart 700 of a host write flow of an embodiment. As shown in FIG. 7, first, the controller 102 of the data storage device 100 receives a host write command with an LBA range and a defrag ID (act 710). Then, the controller 102 checks if the LBA range is in an already-received grouping hint or if the defrag ID in the write command is valid (act 720). If the LBA range is not in an already-received grouping hint or if the defrag ID in the write command is not valid, the controller 102 handles the write command as usual (e.g., by routing it to streams based on write length and command history, or some other way) (act 720). Otherwise, the controller 102 checks if there is already an open sequential stream for this grouping (defrag ID) (act 740). If there is not an open sequential stream for this grouping, the controller 102 opens a new stream for this grouping and routes the data to the new stream (act 750). However, if there is an open sequential stream for this grouping, the controller 102 routes the host data to the open sequential stream (act 760).

During a host read, the controller 102 of the data storage device 100 consults the LBA group table and if the LBA falls in any of the ranges in the hint table, as part of a read look-ahead (RLA) read, the controller 102 can prefetch the control pages and data based on the hint table (in contrast, a typical prefetch can be based on contiguous LBA ranges). The controller 102 can further group all the associated L2P entries for a given identifier and use them during data retrieval, leveraging the fact that the sequential data access works that way. An example of this method is shown in the flow chart 800 of FIG. 8.

Figure 8:
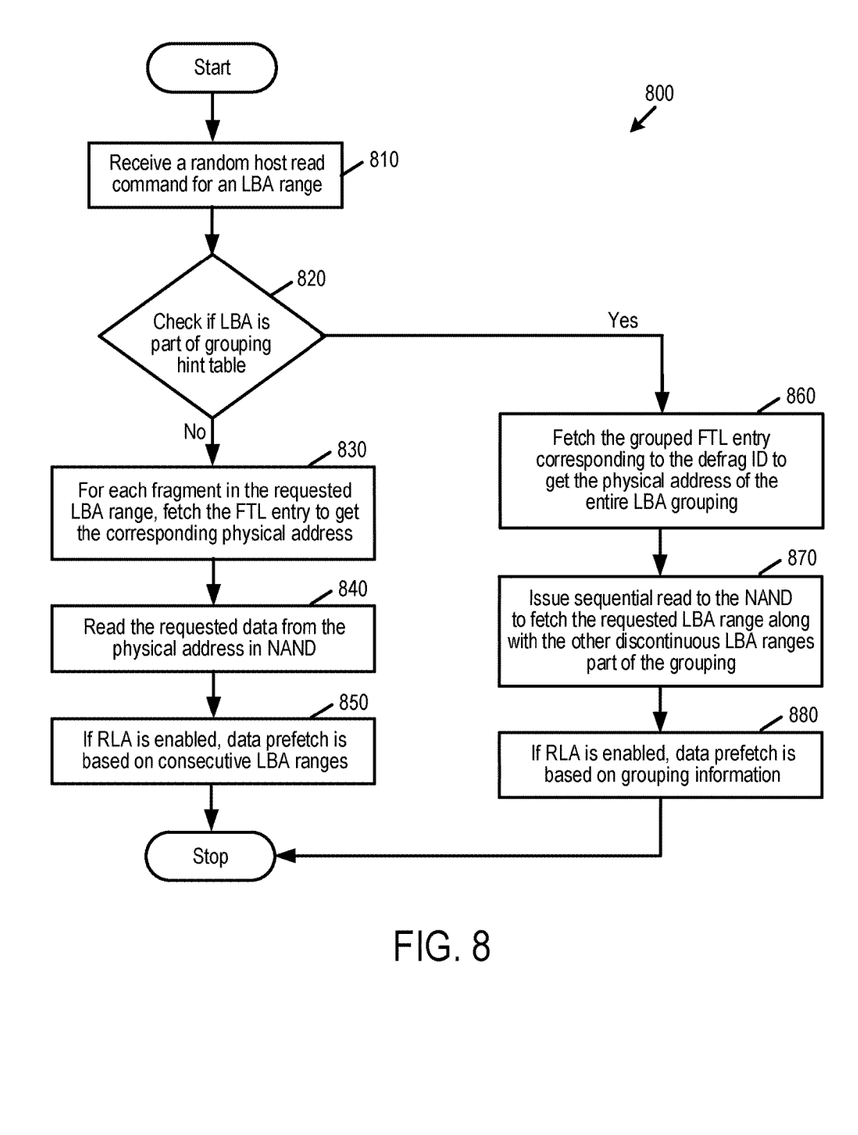
FIG. 8 is a flow chart of a read flow of an embodiment.

As shown in FIG. 8, first, the controller 102 of the data storage device 100 receives a random host read command for an LBA range (act 810). Next, the controller 102 checks if the LBA is part of a grouping hint table (act 820). If the LBA is not part of a grouping hint table, the controller 102 fetches the flash translation table (FTL) entry (e.g., the logical-to-physical address entry) to get the corresponding physical address for each fragment in the requested LBA range (act 830). Then, the controller 102 reads the requested data from the physical addresses in the memory 104 (e.g., NAND) (act 840). If read look-ahead (RLA) is enabled, the controller 102 prefetches the data based on consecutive LBA ranges (act 850).

If the LBA is part of a grouping hint table, the controller 102 fetches the grouped FTL entry corresponding to the defrag ID to get the physical address of the entire LBA grouping (act 860). Then, the controller 102 issues sequential reads to the memory 104 to fetch the requested LBA range along with the other non-continuous LBA ranges that are part of the group (act 870). If read look-ahead (RLA) is enabled, the controller 102 prefetches the data based on the grouping information (act 880).

There are many ways these embodiments can be implemented to provide host LBA group hints and optimize FTL reads. For example, a virtual LBA range can be used. In this example, a virtual LBA is translated from an actual LBA. L2P entries can be used like sequential data. Whereas real LBAs (which will be given by the host 300) can be non-continuous, the translated virtual LBA range will be continuous. This is made possible by having a special virtual LBA range for defrag requests. For example, consider the situation in which the actual device capacity is 64 GB with an LBA range of 0-0x8000000. If three defrag IDs are supported each up to size of 1 GB, the virtual range for each of the defrag IDs will be 0x8000000-0x8200000. When the host 300 uses defrag ID 1 and sends out discontinuous LBA ranges (e.g., 0-100000, 0x2000000-0x280000, and 0x380000 to 0x400000), the addresses can be translated as follows:

$$0 - 100000 \rightarrow 0 \times 8000000 - 8100000$$

$$0 \times 2000000 - 0 \times 280000 \rightarrow 0 \times 8100000 - 8180000$$

$$0 \times 380000 \text{ to } 0 \times 400000 \rightarrow 0 \times 8180000 - 8200000$$

The virtual LBAs can be stored in an FTL table, which will ensure that L2P entries are stored together for these chunks.

In another example, an FTL entry grouping is used. In this example, FTL entries corresponding to each defrag ID are grouped and stored together in the FTL table as metadata. The associated L2P entries of the group are in a consolidated state in the index (thus not requiring any L2P resolution for each and every command falling in that group), and all the host data can be fetched as is done during sequential reads. This is independent of the previous example described above.

There are several advantages associated with these embodiments. For example, since the defragmentation requests are bandwidth expensive, the host 300 may not immediately trigger one just because the host file system needs defragmentation. The host 300 may take a middle ground to extend defragmentation timelines, as well as maintain the QoS on par with a defragmented region until actual defragmentation.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
    a memory; and
    a processor configured to communicate with the memory and further configured to:
        receive, from a host, a plurality of write commands and a grouping identifier associated with the plurality of write commands, wherein the plurality of write commands comprise a plurality of non-sequential logical block addresses and a plurality of sequential segments of a file; and
        in response to the grouping identifier being associated with the plurality of write commands, execute the plurality of write commands by storing the plurality of sequential segments of the file sequentially in the memory even though the logical block addresses associated with the segments of the file are non-sequential;
    wherein the plurality of sequential segments of the file are stored sequentially in the memory without moving the plurality of sequential segments of the file in the memory after execution of the plurality of write commands.

2. The data storage device of claim 1, wherein the processor is further configured to:
    group together logical-to-physical address translation entries for the plurality of non-sequential logical block addresses.

3. The data storage device of claim 1, wherein the processor is further configured to:
    receive an additional write command from the host; and
    determine whether a logical block address in the additional write command is associated with a previously-received grouping identifier.

4. The data storage device of claim 3, wherein the processor is further configured to:
    in response to determining that the logical block address in the additional write command is associated with the previously-received grouping identifier, determine whether there is an open sequential stream for the previously-received grouping identifier.

5. The data storage device of claim 4, wherein the processor is further configured to:
    in response to determining that there is an open sequential stream for the previously-received grouping identifier, route data in the additional write command to the open sequential stream.

6. The data storage device of claim 4, wherein the processor is further configured to:
    in response to determining that there is not an open sequential stream for the previously-received grouping identifier, open a new stream and route data in the additional write command to the opened new stream.

7. The data storage device of claim 1, wherein the processor is further configured to:
    receive a read command from the host; and
    determine whether a logical block address in the read command is associated with the grouping identifier.

8. The data storage device of claim 7, wherein the processor is further configured to:
    in response to determining that the logical block address in the read command is associated with the grouping identifier, retrieve a grouped logical-to-physical address translation entry corresponding to the grouping identifier.

9. The data storage device of claim 7, wherein the processor is further configured to:
    in response to determining that the logical block address in the read command is associated with the grouping identifier, perform sequential read operations to read data in locations in the memory that are associated with the logical block address in the read command and with logical block addresses associated with the grouping identifier.

10. The data storage device of claim 7, wherein the processor is further configured to:
    in response to determining that the logical block address in the read command is associated with the grouping identifier, perform a read look-ahead (RLA) operation.

11. The data storage device of claim 1, wherein the processor is further configured to:
    generate a virtual logical block address range from the plurality of non-sequential logical block addresses.

12. The data storage device of claim 1, wherein the grouping identifier comprises a defragmentation identifier.

13. The data storage device of claim 1, wherein the memory comprises a three-dimensional memory.

14. A data storage device comprising:
    a memory; and
    means for:
        receiving, from a host, a plurality of write commands and a grouping identifier associated with the plurality of write commands, wherein the plurality of write commands comprise a plurality of non-sequential logical block addresses and a plurality of sequential segments of a file; and
        in response to the grouping identifier being associated with the plurality of write commands, executing the plurality of write commands by storing the plurality of sequential segments of the file sequentially in the memory even though the logical block addresses associated with the segments of the file are non-sequential;
    wherein the plurality of sequential segments of the file are stored sequentially in the memory without moving the plurality of sequential segments of the file in the memory after execution of the plurality of write commands.

15. A method comprising:
performing in a data storage device comprising a memory:
   receiving, from a host, a plurality of write commands and a grouping identifier associated with the plurality of write commands, wherein the plurality of write commands comprise a plurality of non-sequential logical block addresses and a plurality of sequential segments of a file; and
   in response to the grouping identifier being associated with the plurality of write commands, executing the plurality of write commands by storing the plurality of sequential segments of the file sequentially in the memory even though the logical block addresses associated with the segments of the file are non-sequential;
   wherein the plurality of sequential segments of the file are stored sequentially in the memory without moving the plurality of sequential segments of the file in the memory after execution of the plurality of write commands.

16. The method of claim 15, further comprising:
grouping together logical-to-physical address translation entries for the plurality of non-sequential logical block addresses.

17. The method of claim 15, further comprising:
receiving an additional write command from the host; and
determining whether a logical block address in the additional write command is associated with a previously-received grouping identifier.

18. The method of claim 15, further comprising:
receiving a read command from the host; and
determining whether a logical block address in the read command is associated with the grouping identifier.

19. The method of claim 15, further comprising:
generating a virtual logical block address range from the plurality of non-sequential logical block addresses.

20. The method of claim 15, wherein the grouping identifier comprises a defragmentation identifier.

\* \* \* \* \*